(12) United States Patent
Mendlowits

(10) Patent No.: US 11,166,139 B2
(45) Date of Patent: Nov. 2, 2021

(54) DUAL SIGNAL WIRELESS AUDIO SYSTEM AND APPLICATION

(71) Applicant: Joseph Mendlowits, New York, NY (US)

(72) Inventor: Joseph Mendlowits, New York, NY (US)

(*) Notice: Subject to any disclaimer, the term of this patent is extended or adjusted under 35 U.S.C. 154(b) by 0 days.

(21) Appl. No.: 16/801,554

(22) Filed: Feb. 26, 2020

(65) Prior Publication Data

US 2021/0266717 A1    Aug. 26, 2021

(51) Int. Cl.
*H04W 4/80* (2018.01)
*H04R 3/00* (2006.01)
*G06F 3/16* (2006.01)
*H04R 1/08* (2006.01)
*H04M 1/72412* (2021.01)

(52) U.S. Cl.
CPC .............. *H04W 4/80* (2018.02); *G06F 3/165* (2013.01); *H04M 1/72412* (2021.01); *H04R 1/083* (2013.01); *H04R 3/00* (2013.01); *H04R 2420/07* (2013.01)

(58) Field of Classification Search
CPC .......... G06F 3/165; G06F 3/011; G06F 3/167; G06F 3/04815; G06F 3/017; G06F 3/162; G06F 3/012; G06F 3/0346; G06F 2203/0381; G06F 3/04847; G06F 3/04883; G06F 3/013; G06F 3/014
USPC ........................................................ 455/41.2
See application file for complete search history.

(56) References Cited

U.S. PATENT DOCUMENTS

2016/0290838 A1* 10/2016 Mudireddy ........... H04L 63/083
2018/0035222 A1*  2/2018 Anderson ............. G10L 19/008
2020/0034109 A1*  1/2020 Price ....................... H04R 1/02

* cited by examiner

*Primary Examiner* — Ajibola A Akinyemi
(74) *Attorney, Agent, or Firm* — Emerson, Thomson, Bennett, LLC

(57) ABSTRACT

Provided in this disclosure is a wireless audio system including one or more wireless transmitters for receiving respective one or more audio signals from respective participants and transmitting the audio signals as one or more respective production quality wireless signals and as one or more respective Bluetooth wireless signals. A receiver is provided for receiving the production quality wireless signals from the participant(s) for subsequent processing. A personal mobile device is provided for receiving the respective Bluetooth wireless signal from the participant(s) and storing the respective Bluetooth wireless signals as retrievable playback sound files for subsequent personal playback by one or more of the participants on the personal mobile device.

8 Claims, 4 Drawing Sheets

DUAL SIGNAL WIRELESS AUDIO SYSTEM AND APPLICATION

I. BACKGROUND

A. Technical Field

The present system and method pertain to the field of audio capture and wireless transmission and reception of an audio signal. The present system and method particularly pertain to the field of professional audio capture and transmission accompanying video recording, for the purpose of reviewing the substantive content a professional quality audio recording.

B. Description of Related Subject Matter

Microphones are employed in the fields of audio technology to capture voice, music and other sounds, for the purpose of recording, amplification, broadcasting, etc. For audio recording applications, as in a studio or the like, the appearance of the microphones is not critical. However, audio technology is a ubiquitous accompaniment in video technology (i.e., broadcasting, recording, etc.). In video applications, the visibility of the microphone is crucial.

In video applications such as a movie shoot or ENG (electronic news gathering) for television or the internee, or for a vocal interview, the audio of a news reporter, interviewer, actor, subject; or other participant can be captured in various different ways. A participant can hold and speak into a hand-held, wired microphone, with a physical, wired connection to an audio mixer/recorder. A shotgun microphone can be placed above and outside the field of view of the participant(s), where such a microphone has a physical, wired connection to an audio mixer/recorder.

Alternatively, a wireless microphone can be employed that includes a wireless transmitter and receiver. Wireless microphones typically include a small lavalier microphone worn inconspicuously near the face of each participant, with a wireless transmitter pack attached to the lavalier microphone via a cable. The wireless transmitter cooperates with a wireless receiver that receives the audio signal from the transmitter and connects to an audio mixer/recorder.

It often happens in professional video production that a news reporter, interviewer, actor, subject, or other participants desire to hear the audio captured during the video recording. Such participants are interested in informally evaluating their performance, in order to improve their presentation skills, among other reasons. However, the audio files are recorded an external audio mixer/recorder component and inaccessible for informal review by the participants.

Moreover, such professionally recorded audio files are typically in the form of large computer files and are not readily available for transfer to a user-friendly format that can be played on a readily available user device such as the participants' smartphones or tablet devices. Thus, the participants typically do not have access to those audio files and cannot review and evaluate their performance.

II. SUMMARY

Provided in this disclosure is a wireless audio system for sending a professional quality audio signal, used for production purposes, and a lower quality audio signal that can be used informally by a participant for evaluation purposes. The present wireless audio system preferably includes a first lavalier microphone for capturing a first audio signal generated by a first participant. The first lavalier microphone further includes a first wireless transmitter for receiving the first audio signal and transmitting the first audio signal as a first production quality wireless signal. The first production quality wireless signal can be either a first UHF (ultra-high frequency) wireless signal or a first 2.4 GHz wireless signal.

A second lavalier microphone is provided for capturing a second audio signal generated by a second participant. The second lavalier microphone includes a second wireless transmitter for receiving the second audio signal and transmitting the second audio signal as a second production quality wireless signal. The second production quality wireless signal can be either a second UHF wireless signal or a second 2.4 GHz wireless signal.

A receiver is provided for receiving the first and second production quality wireless signals. The receiver includes a mixer/recorder component for storing the first and second production quality wireless signal as respective first and second retrievable production sound files for subsequent processing.

A first Bluetooth signal transmitter is provided for transmitting the first audio signal as a first Bluetooth wireless signal. The first Bluetooth signal transmitter is incorporated into either the first wireless transmitter or the receiver. A second Bluetooth signal transmitter is provided for transmitting the second audio signal as a second Bluetooth wireless signal. The second Bluetooth signal transmitter is incorporated into either the second wireless transmitter or the receiver.

A personal mobile device is also provided for receiving the first and second Bluetooth wireless signals and storing the first and second Bluetooth wireless signals as respective first and second retrievable playback sound files. These sound files can be retrieved for subsequent personal playback by one or both of the first and second participants on the personal mobile device, which can be a smartphone or a tablet device.

According to an aspect of the present embodiments, a microphone is provided that enables a news reporter, interviewer, actor, subject, or other participants to hear the audio captured during the video recording.

According to another aspect of the present embodiments, a microphone is provided that enables participants to informally evaluate their performance.

According to still another aspect of the present embodiments, a microphone is provided that enables participants to record an audio file in a user-friendly format that can be played on a readily available user device such as the participants' smartphone or tablet device.

Other benefits and advantages of the present embodiments will become apparent to those skilled in the art to which it pertains upon reading and understanding of the following detailed specification.

III. BRIEF DESCRIPTION OF THE DRAWINGS

The disclosed wireless audio system may take physical form in certain parts and arrangement of parts, embodiments of which will be described in detail in this specification and illustrated in the accompanying drawings which form a part hereof and wherein.

IV. DETAILED DESCRIPTION

Figure 1:
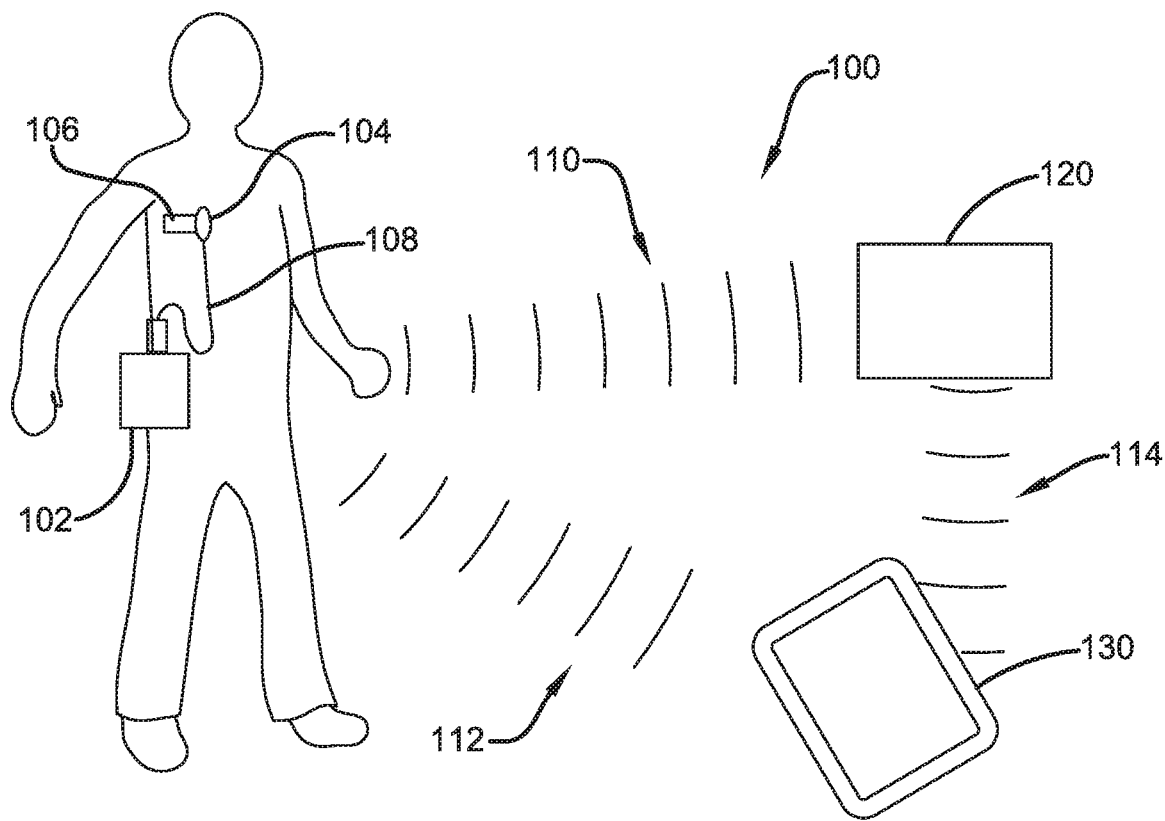
FIG. 1 is a representation of a single transmitter embodiment in accordance with the presently disclosed subject matter.

Referring now to the drawings wherein the showings are for purposes of illustrating embodiments of the device and method and not for purposes of limiting the same, and wherein like reference numerals are understood to refer to like components, FIG. 1 shows the general configuration of the wireless audio system 100 including a wireless signal transmitter 102 for receiving an audio signal and transmitting the audio signal as a production quality wireless signal.

With further reference to FIG. 1, the wireless transmitter 102 receives the audio signal from a microphone 104. In the preferred embodiment, as depicted in FIG. 1, the microphone 104 can be a lavalier microphone 104, worn on the clothing, near the face of a news reporter, interviewer, actor, subject, or other participant. Such a lavalier microphone 104 includes a dip 106 for fastening to a lapel or other portion of clothing. The lavalier microphone 104 also includes a wired connection 108 to the wireless transmitter 102.

As depicted in FIG. 1, a lavalier microphone 104 can be preferably implemented in the present embodiments. However, it is to be appreciated that any other suitable type of microphone 104 can alternatively be implemented with the present embodiments without departing from the presently disclosed subject matter.

With continued reference to FIG. 1, the wireless transmitter 102 transmits the audio signal received from the microphone 104 as a production quality wireless signal 110. The production quality wireless signal 110 can be a UHF wireless signal, or alternatively, a 2.4 GHz wireless signal. It is known in the video production industry that UHF and 2.4 GHz signals can both be used for transmitting a signal of sufficiently high quality or use with professional video production. However, it is to be appreciated that wireless signals of any other suitable band could alternatively be implemented with the present embodiments without departing from the presently disclosed subject matter.

As further shown in FIG. 1, a receiver 120 is provided for receiving the production quality wireless signal 110 from the wireless transmitter 102 for subsequent processing, which can include recording, mixing, or any other audio processing operation. The receiver 120 can be any type of commercially available receiver used for audio/video production. In the preferred embodiment, the receiver 120 can include a mixer/recorder component for storing the production quality wireless signal 110 as one or more retrievable production sound files that can be used for the subsequent processing. Common recorder brands include Zoom models H4n Pro 4, H5, H6, and F6, and Tascam models DR-22WL and DR-60D MKII. The aforementioned recorders can support sound files in any standard computer-implemented file format. The production quality wireless signal 110 can be recorded in a "WAV" file format in sampling frequencies of 44.1, 48, or 96 kHz. Alternatively, a smaller, lower quality audio file that can be shared easily can be recorded in AAC or MP3 format.

As also generally shown on FIG. 1, the wireless transmitter 102 transmits audio signal received from the microphone 104 as the production quality wireless signal 110 in either UHF or 2.4 GHz signal bands. As a special feature of the present embodiments, the audio signal received from the microphone 104 is also is also simultaneously transmitted as a Bluetooth wireless signal. In one embodiment, a Bluetooth wireless signal 112 is transmitted directly from the wireless transmitter 102 to a personal mobile device 130 for receiving the Bluetooth wireless signal 112. In an alternative embodiment, a Bluetooth wireless signal 114 is transmitted from the receiver 120 to the personal mobile device 130. In both embodiments, the personal mobile device 130 stores the received Bluetooth wireless signal 112, 114 as one or more retrievable sound files for subsequent personal playback by a user on the personal mobile device 130. It is to be appreciated that the personal mobile device 130 can be a smartphone or a tablet device such as an iPad. However, any other suitable device such as a laptop computer of the like can also be employed without departing from the disclosed subject matter.

As has been generally shown in FIG. 1, and is further depicted with more specific reference in the block diagrams of FIGS. 2A and 2B, the wireless transmitter 102 can be a single wireless signal transmitter 102 worn on the body of the user or participant, for receiving the audio signal from the microphone 104, which can be a lavalier microphone 104, as described hereinabove. The single wireless transmitter 102 can include a housing that receives and retains a production quality wireless signal transmitter 200 specifically intended for transmitting the production quality wireless signal 110 in either UHF or 2.4 GHz signal bands.

Figure 2A:
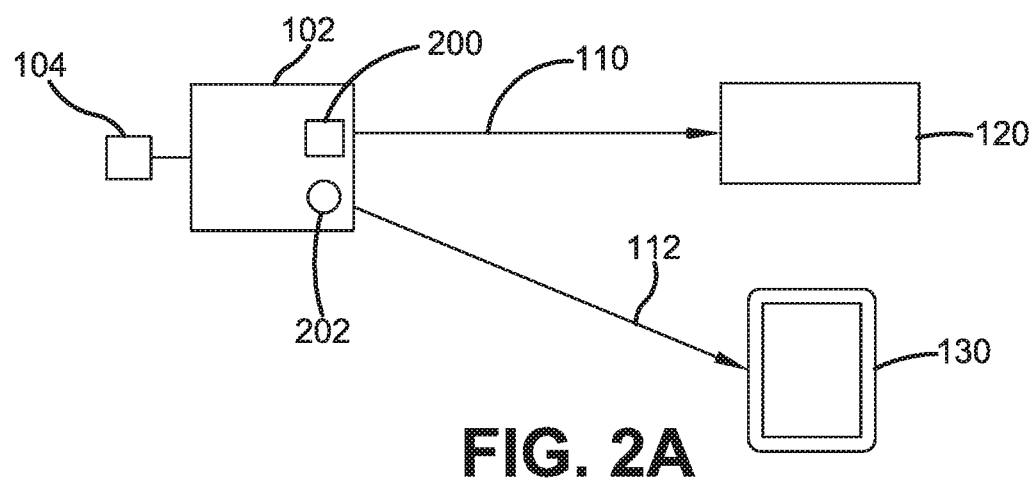
FIG. 2A is a block diagram depicting the components of a single dual signal transmitter embodiment in accordance with the presently disclosed subject matter.
Figure 2B:
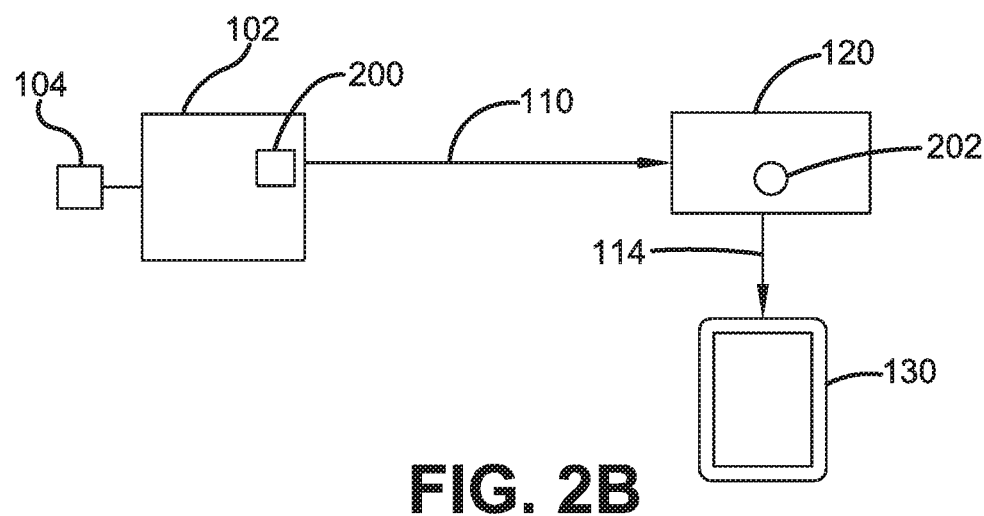
FIG. 2B is a block diagram depicting the components of an alternative single dual signal transmitter embodiment in accordance with the presently disclosed subject matter.

With further reference to FIGS. 2A and 2B, a special feature of the present embodiments is a Bluetooth wireless signal transmitter 202 for transmitting the audio signal as the Bluetooth wireless signal 112, 114. In the embodiment of FIG. 2A, the Bluetooth wireless signal transmitter 202 is incorporated into the housing of the single wireless signal transmitter 102, along with the production quality wireless signal transmitter 200. The Bluetooth wireless signal 112 is transmitted directly from the Bluetooth signal transmitter 202 inside the housing of the wireless transmitter 102 to the personal mobile device 130 for receiving the Bluetooth wireless signal 112.

With continuing specific reference to the alternative embodiment of FIG. 2B, the Bluetooth wireless signal transmitter 202 is incorporated into a housing of the receiver 120. The Bluetooth wireless signal 114 is transmitted directly from the Bluetooth wireless signal transmitter 202 inside the housing of the receiver 120 to the personal mobile device 130 for receiving the Bluetooth wireless signal 114. In both embodiments, the personal mobile device 130 stores the respective Bluetooth wireless signal 112, 114 as one or more retrievable playback sound files for subsequent personal playback by the user on the personal mobile device 130.

Figure 3A:
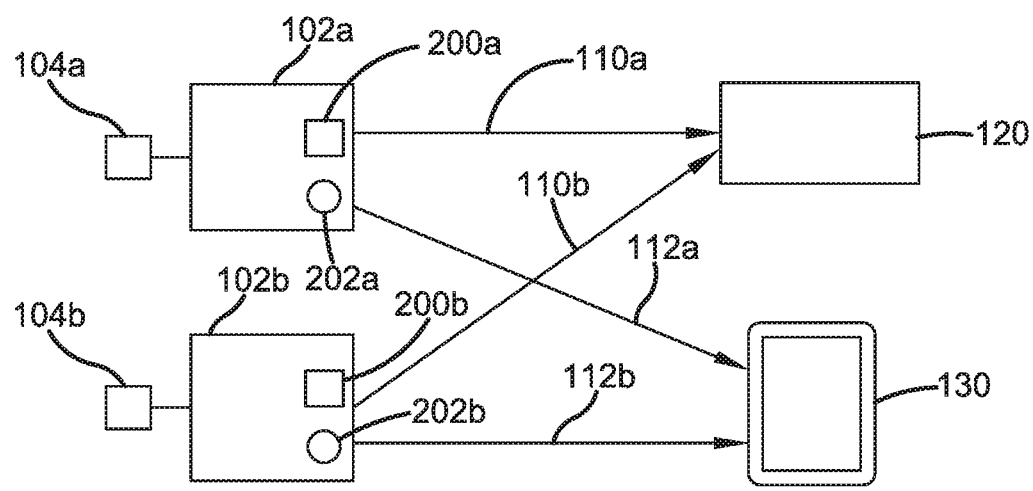
FIG. 3A is a block diagram depicting the components of a double dual signal transmitter embodiment in accordance with the presently disclosed subject matter.
Figure 3B:
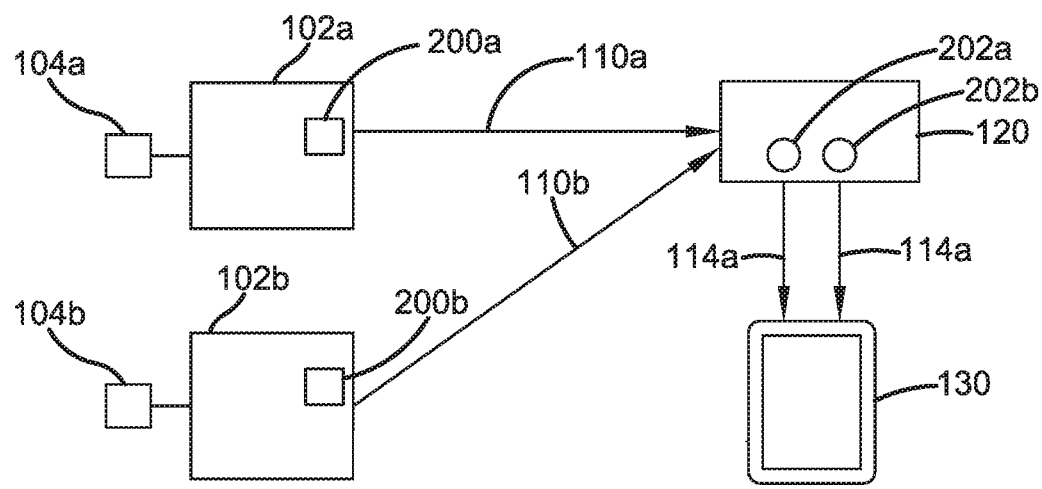
FIG. 3B is a block diagram depicting the components of an alternative double dual signal transmitter embodiment in accordance with the presently disclosed subject matter.

FIGS. 3A and 3B are block diagrams depicting the components of the double dual signal transmitter embodiments in which two wireless signal transmitters 102a, 102b are used, representing two news reporters, interviewers, actors, subjects, or other participants. In both of the embodiments depicted in FIGS. 3A and 3B, a first production quality signal transmitter 200a retained within a first wireless signal transmitter 102a is used for receiving a first audio signal generated by a first microphone 104a worn by a first participant. The first production quality signal transmitter 200a transmits the first audio signal as a first production quality wireless signal 110a to the receiver 120. Similarly, a second production quality signal transmitter 200b retained within a second wireless signal transmitter 102b is used for receiving a second audio signal generated by a second microphone 104b worn by a second participant. The second production quality signal transmitter 200b transmits the second audio signal as a second production quality wireless signal 110b to the receiver 120.

In the embodiments of FIGS. 3A and 3B, the Bluetooth wireless signal transmitter 202 can be two Bluetooth wireless signal transmitters 202a, 202b. In the embodiment of FIG. 3A, a first Bluetooth wireless signal transmitter 202a is incorporated into the housing of the first wireless transmitter 102a, for transmitting the first audio signal directly to the personal mobile device 130 as a first Bluetooth wireless signal 112a. Similarly, a second Bluetooth wireless signal transmitter 202b is incorporated into the housing of the second wireless transmitter 102b, for transmitting the second audio signal directly to the personal mobile device 130 as a second Bluetooth wireless signal 112b.

In the embodiment of FIGS. 3A and 3B the first and second Bluetooth wireless signal transmitters 202a, 202b are incorporated into the housing of the receiver 120 for transmitting the first and second audio signals as respective first and second Bluetooth wireless signals 114a, 114b to the personal mobile device 130. In one aspect, the first and second Bluetooth wireless signal transmitters 202a, 202b can be implemented as a single transmitter capable of sending both the first and second Bluetooth wireless signals 114a, 114b. In another aspect, the first and second Bluetooth wireless signal transmitters 202a, 202b can be implemented separately as two distinct transmitters in the same housing of the receiver 120 for each sending respective first and second Bluetooth wireless signals 114a, 114b.

Figure 4:
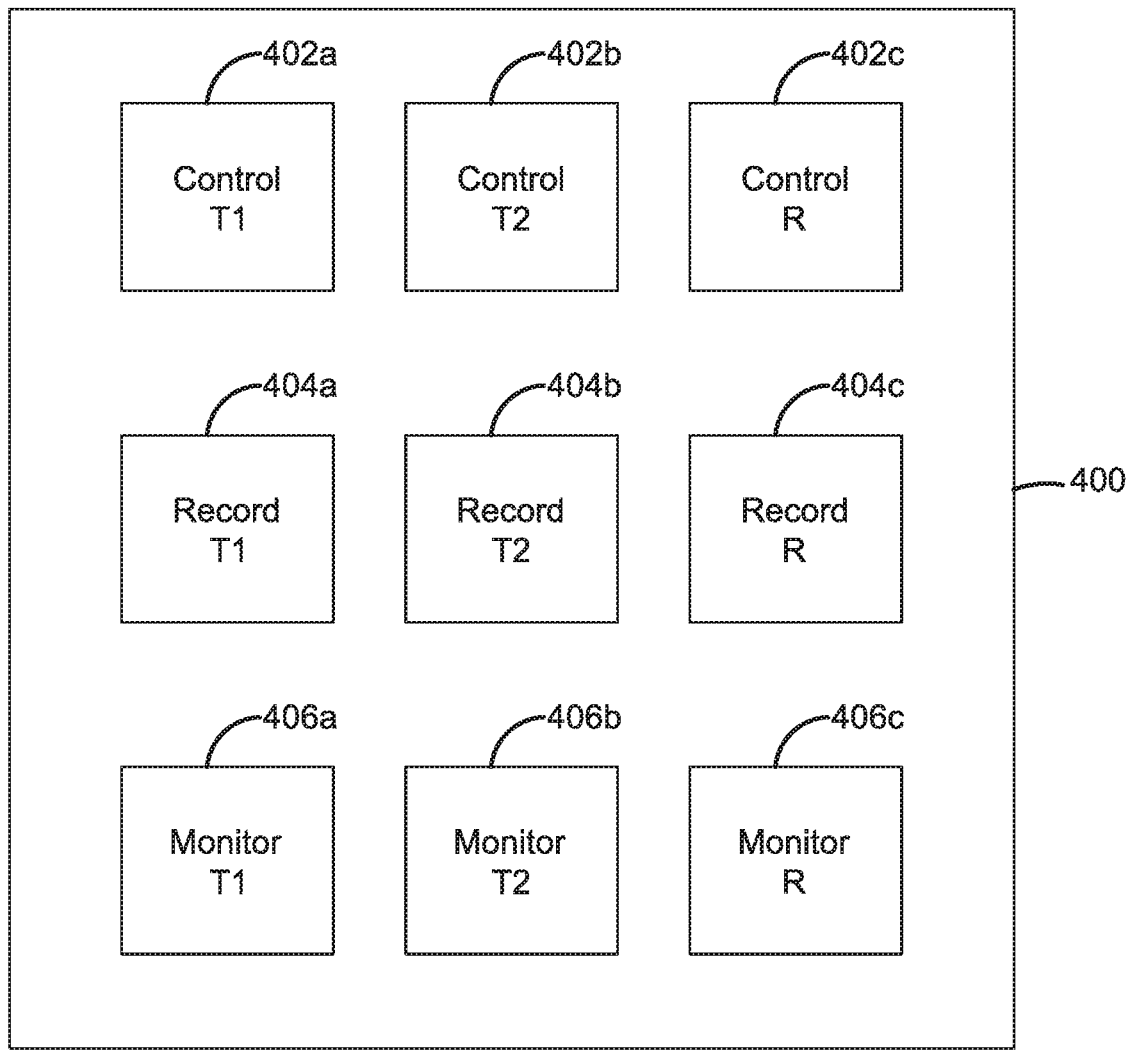
FIG. 4 is a block diagram depicting a control and monitoring application in accordance with the presently disclosed subject matter.

FIG. 4 is a block diagram depicting a control and monitoring application that can be implemented with any of the embodiments depicted in FIGS. 1, 2A, 2B, 3A, and 3C hereinabove. Such a suitable application ("app") for a smartphone or tablet can be utilized on the personal mobile device 130 for wirelessly controlling the Bluetooth signal transmitter(s) 202, 202a, 202b. The app 400 can provide control, recording, and monitoring over the single or first and/or second Bluetooth signal transmitters 202, 202a, 202b, along with the receiver 120.

As specifically shown in FIG. 4, the app 400 can have a first transmitter control 402a, a second transmitter control 402b, and a receiver control 402c, having respective control and function capabilities over the single or first and/or second Bluetooth signal transmitters 202, 202a, 202b, and/or the receiver 120. The app 400 can also have a first transmitter record function 404a, a second transmitter record function 404b, and a receiver record function 404c, having the capability to record audio from the single or first and/or second Bluetooth signal transmitters 202, 202a, 202b, and/or the receiver 120. The app 400 can also have a first transmitter monitor function 406a, a second transmitter monitor function 406b, and a receiver monitor function 406c, having the capability to monitor the temperature and battery life from the single or first and/or second Bluetooth signal transmitters 202, 202a, 202b, and/or the receiver 120.

The app 400 depicted in FIG. 4 preferably has respective versions compatible with Android and iOS smartphone operating systems, for implementation on such suitable devices. When using the iOS or Android versions of the application 400, the user would only need to connect one or more of the Bluetooth signal transmitter(s) 202, 202a, 202b or the receiver 120 to a personal mobile device 130 such as a smartphone or tablet and still be able to control all of the functions of the Bluetooth signal transmitter(s) 202, 202a, 202b, and/or the receiver 120. Alternatively, the Bluetooth signal transmitter(s) 202, 202a, 202b, and/or the receiver 120 can be able to connect to an Android or iOS smartphone/tablet even without the app 400 and have some functions (though with the app 400, the full controls and functions are enabled).

The operation of the computer-implemented application 400 for the personal mobile device 130 according to FIG. 4 includes computer executable instructions for controlling the wireless transmitter 102 that receives the audio signal and transmits the audio signal as the production quality wireless signal 110. The app 400 also includes computer executable instructions for controlling the receiver 120 that receives the production quality wireless signal 110 for subsequent processing. The app 400 further includes computer executable instructions for controlling the Bluetooth signal transmitter 202 for transmitting the audio signal as the Bluetooth wireless signal 112, 114. The Bluetooth signal transmitter 202 can be incorporated into one or both of the wireless transmitter 102 or the receiver 120. Further computer executable instructions are included in the app 400 for controlling reception of the Bluetooth wireless signal 112, 114 on the personal mobile device 130. Still further computer executable instructions are included in the app 400 for controlling storage of the Bluetooth wireless signal 112, 114 on the personal mobile device 130 as one or more retrievable playback sound files for subsequent personal playback by a user on the personal mobile device 130.

With further reference to the computer-implemented application 400 of FIG. 4, the instructions for controlling the wireless transmitter 102 can include computer executable instructions for controlling the first wireless transmitter 102a that receives the first audio signal generated by the first participant for transmitting the first audio signal as the first production quality wireless signal 110a to the receiver 120. The app 400 can also include computer executable instructions for controlling the second wireless transmitter 102b that receives the second audio signal generated by the second participant and transmits the second audio signal as the second production quality wireless signal 110b to the receiver 120.

With further reference to the computer-implemented application 400 of FIG. 4, the instructions for controlling the Bluetooth signal transmitter 202 can include computer executable instructions for controlling the first Bluetooth signal transmitter 202a, incorporated into the first wireless transmitter 102a, for transmitting the first audio signal to the personal mobile device 130 as the first Bluetooth wireless signal 112a. The app 400 can also include computer executable instructions for controlling the second Bluetooth signal transmitter 202b, incorporated into the second wireless transmitter 102b, for transmitting the second audio signal to the personal mobile device 130 as the second Bluetooth wireless signal 112b. The app 400 can also include computer executable instructions for monitoring and displaying temperature and battery life of the wireless transmitter(s) 102, 102a, 102b and the receiver 120.

Numerous embodiments have been described herein. It will be apparent to those skilled in the art that the above methods and apparatuses may incorporate changes and modifications without departing from the general scope of the present embodiments. It is intended to include all such modifications and alterations in so far as they come within the scope of the appended claims or the equivalents thereof.

Having thus described the present embodiments, it is now claimed:

1. A wireless audio system, comprising:
   a first lavalier microphone for capturing a first audio signal generated by a first associated participant, said first lavalier microphone further comprising a first wireless transmitter for receiving said first audio signal and transmitting said first audio signal as a first production quality wireless signal comprising at least one of a first UHF wireless signal or a first 2.4 GHz wireless signal;
   a second lavalier microphone for capturing a second audio signal generated by a second associated participant, said second lavalier microphone further comprising a second wireless transmitter for receiving said second audio signal and transmitting said second audio signal as a second production quality wireless signal comprising at least one of a second UHF wireless signal or a second 2.4 GHz wireless signal;
   a first Bluetooth signal transmitter for transmitting said first audio signal as a first Bluetooth wireless signal
   a second Bluetooth signal transmitter for transmitting said second audio signal as a second Bluetooth wireless signal; and
   a receiver for receiving said first and second production quality wireless signals but neither said first nor said second Bluetooth wireless signals, said receiver comprising a mixer/recorder component for storing said first and second production quality wireless signal as respective first and second retrievable production sound files for subsequent processing;
   a personal mobile device for receiving said first and second Bluetooth wireless signals but neither said first nor said second production quality wireless signals;
   wherein said personal mobile device stores said first and second Bluetooth wireless signals as respective first and second retrievable playback sound files for subsequent personal playback by at least one of said first and second associated participants on said personal mobile device.

2. The wireless audio system of claim 1 wherein:
   said first production quality wireless signal and said first Bluetooth wireless signal are transmitted simultaneously; and
   said second production quality wireless signal and said second Bluetooth wireless signal are transmitted simultaneously.

3. The wireless audio system of claim 1 wherein:
   said first lavalier microphone includes a wired connection to said first wireless transmitter; and
   said second lavalier microphone includes a wired connection to said second wireless transmitter.

4. The wireless audio system of claim 1 wherein:
   said personal mobile device comprises a smartphone.

5. The wireless audio system of claim 1 wherein:
   said personal mobile device comprises a tablet device.

6. The wireless audio system of claim 1 wherein:
   said personal mobile device comprises an application for wirelessly controlling said first and second Bluetooth signal transmitters.

7. The wireless audio system of claim 1 further comprising:
   first and second housings;
   wherein: the first wireless transmitter and the first Bluetooth signal transmitter are retained in the first housing; and the second wireless transmitter and the second Bluetooth signal transmitter are retained in the second housing.

8. The wireless audio system of claim 7 wherein:
   the first housing is adapted to be worn by the first associated participant; and
   the second housing is adapted to be worn by the second associated participant.

* * * * *